(12) United States Patent
Kawamura et al.

(10) Patent No.: US 8,325,593 B2
(45) Date of Patent: Dec. 4, 2012

(54) MOBILE COMMUNICATION SYSTEM, BASE STATION, USER DEVICE, AND METHOD

(75) Inventors: Teruo Kawamura, Yokosuka (JP);
Yoshihisa Kishiyama, Yokosuka (JP);
Kenichi Higuchi, Saitama (JP);
Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 130 days.

(21) Appl. No.: 12/739,877

(22) PCT Filed: Oct. 27, 2008

(86) PCT No.: PCT/JP2008/069483
§ 371 (c)(1),
(2), (4) Date: Aug. 17, 2010

(87) PCT Pub. No.: WO2009/057566
PCT Pub. Date: May 7, 2009

(65) Prior Publication Data
US 2010/0309857 A1    Dec. 9, 2010

(30) Foreign Application Priority Data

Oct. 30, 2007    (JP) .................................. 2007-282441

(51) Int. Cl.
*H04J 11/00*    (2006.01)
*H04L 12/26*    (2006.01)
*H04L 12/28*    (2006.01)
*H04L 12/56*    (2006.01)
*H04B 7/204*    (2006.01)

(52) U.S. Cl. .... 370/208; 370/252; 370/319; 370/395.21
(58) Field of Classification Search .................. None
See application file for complete search history.

(56) References Cited

U.S. PATENT DOCUMENTS
8,031,688 B2 * 10/2011 Papasakellariou et al. ... 370/344
(Continued)

FOREIGN PATENT DOCUMENTS
EP    2 169 861 A1    3/2010
(Continued)

OTHER PUBLICATIONS
U.S. Appl. No. 60/964,878, Pajukoski et al., Coordinated Cyclic Shift and Sequence Hopping for Zadoff-Chu, Modified Zadoff-Chu, and Block-Wise Spreading Sequences, Aug. 15, 2007, pp. 7-8, 15-16.*
(Continued)

*Primary Examiner* — Chirag Shah
*Assistant Examiner* — Ashley Shivers
(74) *Attorney, Agent, or Firm* — Osha Liang LLP

(57) ABSTRACT

A user device transmitting at least an uplink control channel using a single carrier scheme includes a channel quality indicator generating unit configured to generate a channel quality indicator indicating a downlink radio propagation condition; and a transmitting unit configured to transmit the uplink control channel including the channel quality indicator using a dedicated frequency band when no radio resource is allocated for transmission of an uplink data channel. The transmitting unit is configured to transmit a predetermined number of unit blocks in each slot period. If a system bandwidth is greater than a predetermined value, a set of factors used to multiply some of the unit blocks belonging to the same slot and containing the same information represents an orthogonal sequence; and a predetermined number of symbol elements constituting each of the some of the unit blocks represent at least a part of the channel quality indicator.

21 Claims, 11 Drawing Sheets

U.S. PATENT DOCUMENTS

| | | | |
|---|---|---|---|
| 2007/0171995 A1* | 7/2007 | Muharemovic et al. | 375/260 |
| 2008/0139237 A1* | 6/2008 | Papasakellariou | 455/522 |
| 2008/0298433 A1* | 12/2008 | Tiirola et al. | 375/132 |
| 2010/0074128 A1 | 3/2010 | Ishii | |

FOREIGN PATENT DOCUMENTS

| | | |
|---|---|---|
| WO | 2008/105420 A1 | 9/2008 |
| WO | 2008/156061 A1 | 12/2008 |

OTHER PUBLICATIONS

U.S. Appl. No. 60/934,066, Papasakellariou et al., Transmission of Control Signals in SC-FDMA Communication Systems, Jun. 11, 2007, pp. 7-8.*

NTT DoCoMo, et al., "CDM-based Multiplexing Method of Multiple ACK/NACK and CQI for E-UTRA Uplink," 3GPP TSG RAN WG1 Meeting #46bis, R1-062742, Oct. 9-13, 2006, 6 pages.

NTT DoCoMo, "On CQI Reporting in E-UTRA," 3GPP TSG RAN WG1 Meeting #50bis, R1-074289, Oct. 8-12, 1007, 4 pages.

NTT DoCoMo, et al., "CDMA-Based Control Signaling Multiplexing in E-UTRA Uplink," 3GPP TSG RAN WG1 Meeting #49, R1-072438, May 7-11, 2007, 3 pages.

NTT DoCoMo, "Multiplexing Schemes for UL Control Signals," 3GPP TSG RAN WG1 Meeting #50bis, R1-074287, Oct. 8-12, 2007, 3 pages.

3GPP TS 36.211 V8.0.0, Sep. 2007, "Evolved Universal Terrestrial Radio Access (E-UTRA), Physical channels and modulation," 49 pages.

International Search Report issued in PCT/JP2008/069483, mailed on Jan. 27, 2009, with translation, 9 pages.

Written Opinion issued in PCT/JP2008/069483, mailed on Jan. 27, 2009, 4 pages.

* cited by examiner

FIG.1
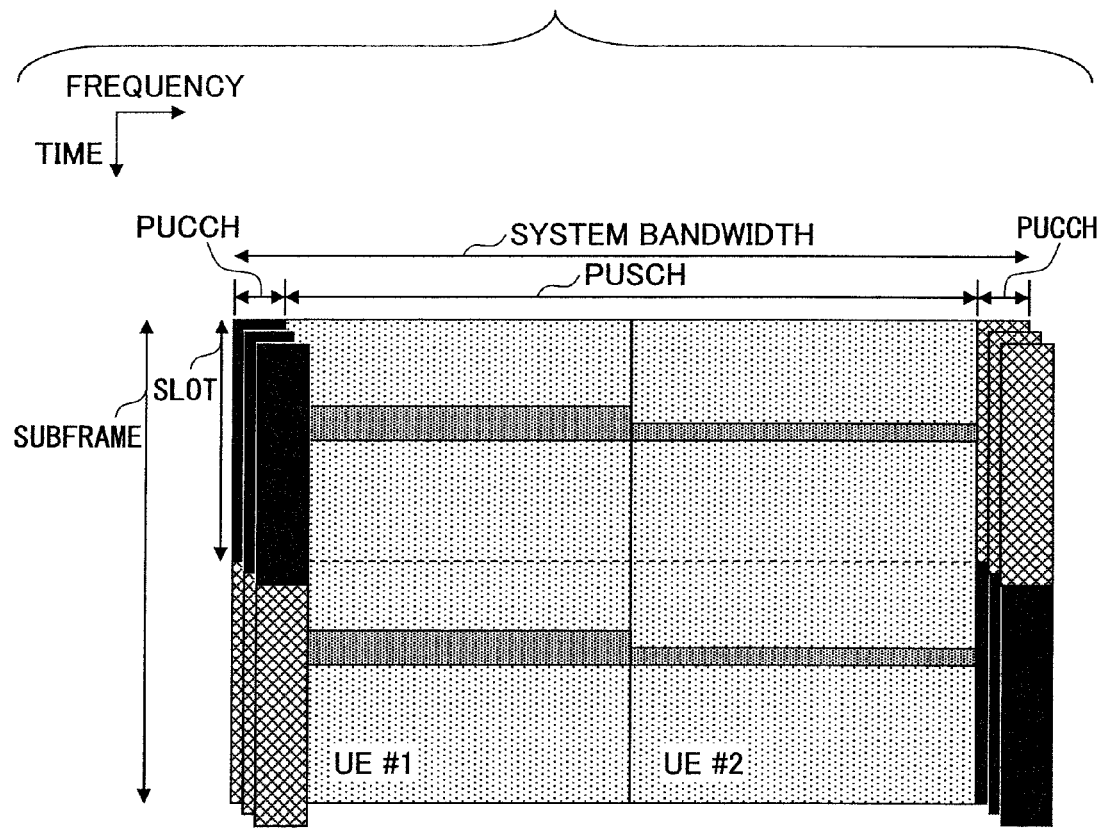
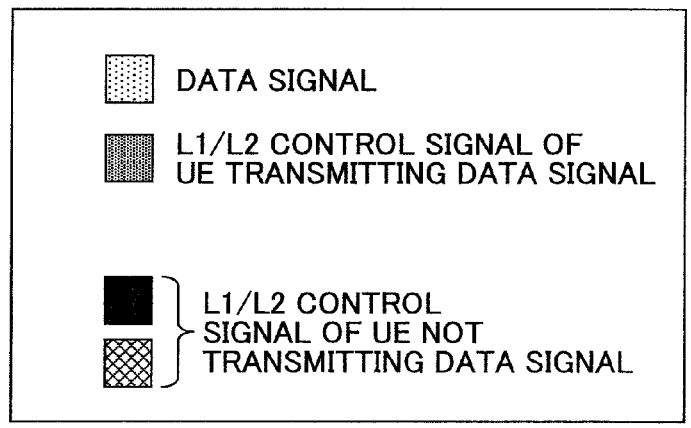

FIG.6

| CONTROL INFORMATION | ORTHOGONAL MULTIPLEXING METHOD | |
|---|---|---|
| ACK/NACK | CAZAC SEQUENCE AND BLOCK SPREADING CODE SEQUENCE | |
| CQI | WHEN SYSTEM BANDWIDTH IS WIDE | BLOCK SPREADING CODE SEQUENCE |
| | WHEN SYSTEM BANDWIDTH IS NARROW | CAZAC SEQUENCE |

US 8,325,593 B2

MOBILE COMMUNICATION SYSTEM, BASE STATION, USER DEVICE, AND METHOD

TECHNICAL FIELD

The present invention generally relates to a mobile communication system, a base station, a user device, and a method for transmitting and receiving an uplink control channel.

BACKGROUND ART

An Evolved UTRA or Long Term Evolution (LTE) system is currently being discussed by 3GPP, a standardization group for W-CDMA. LTE is a successor communication scheme to wideband code division multiple access (W-CDMA), high speed downlink packet access (HSDPA), and high speed uplink packet access (HSUPA). In the LTE system, orthogonal frequency division multiplexing (OFDM) is to be used for downlink and single-carrier frequency division multiple access (SC-FDMA) is to be used for uplink (see, for example, 3GPP TS36.211 (V8.0.0), September 2007).

In both downlink and uplink of the LTE system, one or more resource blocks are allocated to a user device (user equipment: UE) for communications. Resource blocks are shared by multiple user devices in the system. In LTE, a base station performs a process called scheduling to select user devices to which resource blocks are to be allocated in each subframe of 1 ms. A subframe may also be called a transmission time interval (TTI). One subframe includes multiple (e.g., two) slots. In downlink, the base station transmits a shared channel using one or more resource blocks to user devices selected in the scheduling. This downlink shared channel is called a physical downlink shared channel (PDSCH). In uplink, user devices selected in the scheduling transmit a shared channel using one or more resource blocks to the base station. This uplink shared channel is called a physical uplink shared channel (PUSCH).

In a communication system employing shared channels, it is necessary to signal (or report) allocation information of the shared channels to user devices for each subframe. A control channel used for this signaling in LTE is called a physical downlink control channel (PDCCH) or a downlink L1/L2 control channel. The physical downlink control channel (PDCCH) includes, for example, downlink scheduling information, acknowledgement information (ACK/NACK), an uplink scheduling grant, an overload indicator, and a transmission power control (TPC) command bit.

FIG. 1 shows an uplink frame structure and relationships between a subframe, slots, a PUSCH, and a PUCCH. An uplink L1/L2 control signal may be transmitted together with the physical uplink shared channel (PUSCH) using resources allocated to the PUSCH, or transmitted using resources dedicated to control signals. The uplink L1/L2 control signal to be transmitted together with the PUSCH includes scheduling information for the PUSCH. The uplink L1/L2 control signal to be transmitted using dedicated resources is called a physical uplink control channel (PUCCH). The physical uplink control channel includes, for example, a downlink channel quality indicator (CQI) and acknowledgement information (ACK/NACK) for the physical downlink shared channel. The CQI is used for scheduling and adaptive modulation and coding (AMC) of the physical downlink shard channel. The acknowledgement information includes either acknowledgement (ACK) indicating that the PDSCH has been properly received or negative acknowledgement (NACK) indicating that the PDSCH has not been properly received. A narrow frequency band is allocated to the PUCCH. However, since the PUCCH is transmitted according to a frequency hopping scheme in a subframe, the reception quality of the PUCCH is improved due to the frequency diversity gain.

If the proportion of the frequency band occupied by the PUCCH to the system frequency band is large, the amount of resources for transmitting the physical uplink shared channel (PUSCH) is reduced. Therefore, to improve the throughput, the proportion of the frequency band of the PUCCH to the system frequency band is preferably small. Meanwhile, users who are not transmitting the physical uplink shared channel (PUSCH) have to transmit CQIs and ACK/NACK via the PUCCH. To enable such users to smoothly report CQIs and ACK/NACK, it is preferable to increase the amount of radio resources for the PUCCH. Thus, it is necessary to enable a large number of users to efficiently use the PUCCH. However, methods for mapping CQIs and ACK/NACK and for multiplexing multiple users in the PUCCH have not been fully discussed yet.

DISCLOSURE OF INVENTION

Problems to be Solved by the Invention

One object of the present invention is to efficiently transmit channel quality indicators (CQI) and acknowledgement information (ACK/NACK) using a physical uplink control channel (PUCCH).

Means for Solving the Problems

An aspect of the present invention provides a user device transmitting at least an uplink control channel using a single carrier scheme. The user device includes a channel quality indicator generating unit configured to generate a channel quality indicator indicating a downlink radio propagation condition; and a transmitting unit configured to transmit the uplink control channel including the channel quality indicator using a dedicated frequency band when no radio resource is allocated for transmission of an uplink data channel. The transmitting unit is configured to transmit a predetermined number of unit blocks in each slot period. If a system bandwidth is greater than a predetermined value, a set of factors used to multiply some of the unit blocks belonging to the same slot and containing the same information represents an orthogonal sequence; and a predetermined number of symbol elements constituting each of the some of the unit blocks represent at least a part of the channel quality indicator.

Advantageous Effect of the Invention

An aspect of the present invention makes it possible to efficiently transmit channel quality indicators (CQI) and acknowledgement information (ACK/NACK) using a physical uplink control channel (PUCCH).

BRIEF DESCRIPTION OF THE DRAWINGS

FIG. 1 is a drawing illustrating an uplink frame structure.

FIG. 6 is a table showing a correspondence between control information and orthogonal multiplexing methods;

EXPLANATION OF REFERENCES

Figure 2:
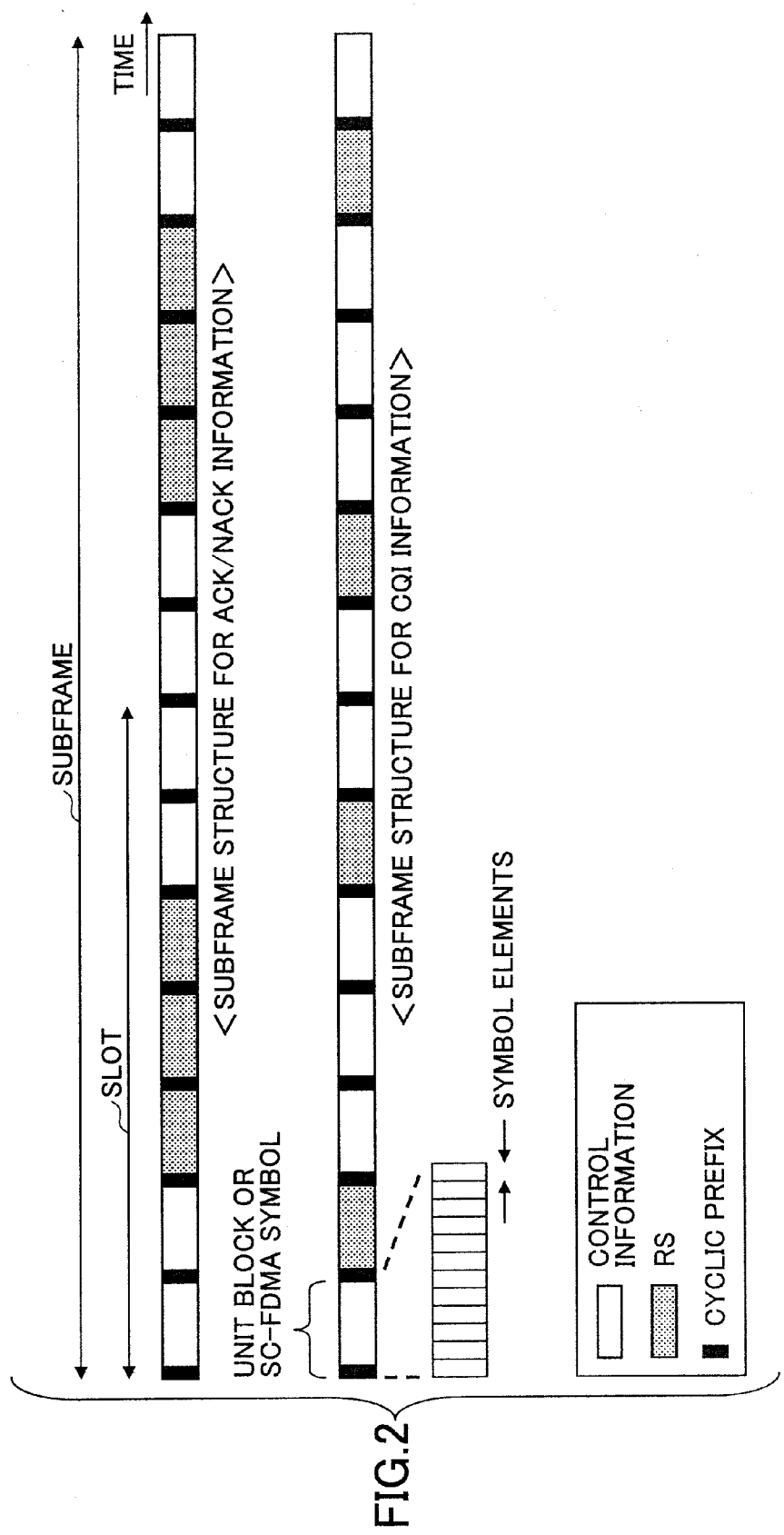
FIG. 2 is a drawing illustrating subframe structures for control information.

802 OFDM signal demodulation unit
804 Downlink control signal decoding unit
806 ACK/NACK determining unit
810 ACK/NACK control information processing block
811 CAZAC sequence generating unit
812 Block modulation unit
813 Discrete Fourier transform unit
814 Subcarrier mapping unit
815 Inverse fast Fourier transform unit
816 Cyclic shift unit
817 Block spreading unit
818 CP adding unit
820 Reference signal processing block
821 CAZAC sequence generating unit
823 Discrete Fourier transform unit
824 Subcarrier mapping unit
825 Inverse fast Fourier transform unit
826 Cyclic shift unit
827 Block spreading unit
828 CP adding unit
830 Time-division multiplexing unit
910 CQI control information processing block
911 Channel coding unit
912 Data modulation unit
913 Discrete Fourier transform unit
914 Subcarrier mapping unit
915 Inverse fast Fourier transform unit
917 Block spreading unit
918 CP adding unit
102 Uplink-resource-allocation-information signal generating unit
104 OFDM signal generating unit
106 Synchronization-detection-and-channel-estimation unit
108 CP removing unit
110 Block despreading unit
112 Cyclic shift unit
114 Fast Fourier transform unit
116 Subcarrier demapping unit
118 Inverse discrete Fourier transform unit
120 Data demodulation unit
122 Decoding unit
124 ACK/NACK determining unit
128 CP removing unit
130 Block despreading unit
134 Fast Fourier transform unit
136 Subcarrier demapping unit
138 Inverse discrete Fourier transform unit
140 Data demodulation unit
142 Decoding unit

BEST MODE FOR CARRYING OUT THE INVENTION

According to an embodiment of the present invention, if a system bandwidth is greater than a predetermined value, a set of factors used to multiply some of unit blocks belonging to the same slot of a PUCCH and containing the same information represents an orthogonal sequence, and a predetermined number of symbol elements constituting each of the some of the unit blocks represent at least a part of a channel quality indicator.

If the system bandwidth is less than or equal to the predetermined value, the predetermined number of symbol elements constituting each of the some of the unit blocks represent a sequence obtained by multiplying an entire orthogonal sequence having a predetermined length by a first factor, and a set of the first factors used to multiply the some of the unit blocks represents at least a part of the channel quality indicator.

The orthogonal sequence represented by the predetermined number of symbol elements may be a CAZAC sequence.

If the system bandwidth is greater than the predetermined value, acknowledgement information indicating acknowledgement or negative acknowledgement for a downlink data channel may be transmitted in a slot different from a slot where the channel quality indicator is transmitted.

A predetermined number of symbol elements constituting each of some of the unit blocks may represent a sequence obtained by multiplying an entire orthogonal sequence having a predetermined length by a first factor and a second factor. In this case, a set of the first factors used to multiply the some of the unit blocks may represent the acknowledgement information. Also, a set of the second factors used to multiply the some of the unit blocks belonging to the same slot and containing the same information may represent an orthogonal sequence.

A reference symbol may be transmitted at least in one of the unit blocks in each slot period. The reference symbol may be represented by a CAZAC sequence.

The structure of a slot including unit blocks for the channel quality indicator and the reference symbol may be different from the structure of a slot including unit blocks for acknowledgement information and the reference symbol.

An embodiment of the present invention provides a base station receiving at least an uplink control channel using a single carrier scheme. The base station includes a receiving unit configured to receive the uplink control channel including a channel quality indicator using a dedicated frequency band when no radio resource is allocated for transmission of an uplink data channel; and an extracting unit configured to extract the channel quality indicator indicating a downlink radio propagation condition from the uplink control channel. The receiving unit is configured to receive a predetermined number of unit blocks in each slot period. if a system bandwidth is greater than a predetermined value, a set of factors used to multiply some of unit blocks belonging to the same slot and containing the same information represents an orthogonal sequence, and a predetermined number of symbol elements constituting each of the some of the unit blocks represent at least a part of a channel quality indicator.

An embodiment of the present invention provides a user device transmitting at least an uplink control channel using a single carrier scheme. The user device includes a first control information generating unit configured to generate first control information to be reported to a base station at predetermined intervals; a second control information generating unit configured to generate second control information different from the first control information; a transmitting unit configured to transmit the uplink control channel including at least one of the first control information and the second control information using a dedicated frequency band when no radio resource is allocated for transmission of an uplink data channel. The transmitting unit is configured to transmit a predetermined number of unit blocks in each slot period. A set of factors used to multiply some of the unit blocks belonging to a first slot and containing the same information represents an orthogonal sequence. A predetermined number of symbol elements constituting each of the some of the unit blocks in the first slot represent at least a part of the first control information. A predetermined number of symbol elements constituting each of some of the unit blocks in a second slot represent a sequence obtained by multiplying an entire orthogonal sequence having a predetermined length by a first factor and a second factor. A set of the first factors used to multiply the some of the unit blocks in the second slot represents the second control information. A set of the second factors used to multiply the some of the unit blocks belonging to the second slot and containing the same information represents an orthogonal sequence.

An embodiment of the present invention provides a base station receiving at least an uplink control channel using a single carrier scheme. The base station includes a receiving unit configured to receive the uplink control channel including at least one of first control information and second control information using a dedicated frequency band when no radio resource is allocated for transmission of an uplink data channel; a first extracting unit configured to extract the first control information reported from a user device at predetermined intervals from the uplink control channel; and a second extracting unit configured to extract the second control information different from the first control information. The receiving unit is configured to receive a predetermined number of unit blocks in each slot period. A set of factors used to multiply some of the unit blocks belonging to a first slot and containing the same information represents an orthogonal sequence. A predetermined number of symbol elements constituting each of the some of the unit blocks in the first slot represent at least a part of the first control information. A predetermined number of symbol elements constituting each of some of the unit blocks in a second slot represent a sequence obtained by multiplying an entire orthogonal sequence having a predetermined length by a first factor and a second factor, and a set of the first factors used to multiply the some of the unit blocks in the second slot represents the second control information. A set of the second factors used to multiply the some of the unit blocks belonging to the second slot and containing the same information represents an orthogonal sequence.

Although specific values are used in the descriptions below to facilitate the understanding of the present invention, the values are just examples and any other appropriate values may also be used unless otherwise mentioned.

First Embodiment

<Subframe Structure>

In this embodiment, it is assumed that a subframe of, for example, 1 ms is used to transmit a physical uplink control channel (PUCCH). A subframe includes two slots with a length of 0.5 ms. One slot includes 7 unit blocks each including 12 symbol elements. When, for example, QPSK is used as the data modulation scheme for the PUCCH, one symbol element corresponds to two bits of information. The unit block may also be called a single-carrier frequency division multiple access (SC-FDMA) symbol.

In a subframe structure (slot structure) of this embodiment for transmitting acknowledgement information (ACK/NACK) to the base station, the third through fifth unit blocks from the beginning of a slot contain reference symbols (RS) and other unit blocks (the first, second, sixth, and seventh unit blocks) in the slot contain the acknowledgement information. This slot structure is repeated twice in a subframe structure and the subframe structure is repeated every subframe.

Meanwhile, in a subframe structure (slot structure) for transmitting a channel quality indicator (CQI) to the base station, the second and sixth unit blocks from the beginning of a slot contain reference symbols (RS) and other unit blocks (the first, third, fourth, fifth, and seventh unit blocks) in the slot contain the CQI. This slot structure is repeated twice in a subframe structure and the subframe structure is repeated every subframe.

Thus, in this embodiment, different subframe structures are used for the acknowledgement information (ACK/NACK) and the channel quality indicator (CQI).

<Orthogonal Multiplexing Method Using Cyclically-Shifted CAZAC Sequences>

Various methods may be used to multiplex multiple users in the PUCCH. Among them, two methods seem to be promising in terms of increasing the number of users to be multiplexed and maintaining high orthogonality. One of the two methods is an orthogonal multiplexing method using orthogonal sequences (CAZAC sequences) and another is an orthogonal multiplexing method using block spreading code sequences.

Figure 3:
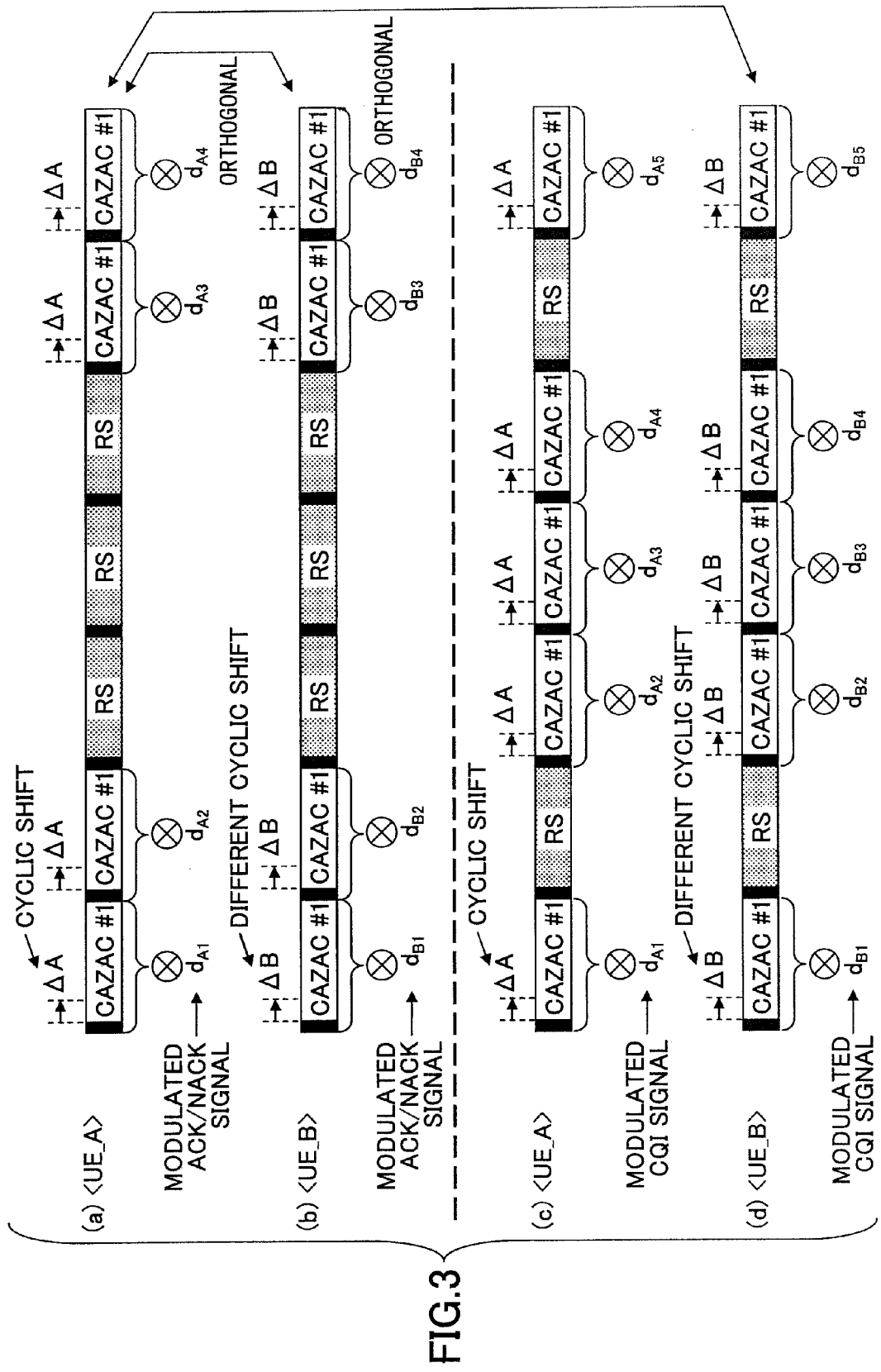
FIG. 3 is a drawing illustrating an orthogonal multiplexing method using CAZAC sequences.

FIG. 3 illustrates an orthogonal multiplexing method using cyclically-shifted constant amplitude zero auto correlation (CAZAC) sequences. As is known, a CAZAC sequence CAZAC#1 ($\Delta=0$) (hereafter, "CAZAC sequence CAZAC#1" is simply called "sequence CAZAC#1") with a sequence length L and a sequence CAZAC#1 ($\Delta=\Delta$) obtained by cyclically shifting the sequence CAZAC#1 ($\Delta=0$) by $\Delta(1 \leq \Delta \leq L-1)$ are orthogonal to each other. Accordingly, the sequence CAZAC#1 with a sequence length L and sequences CAZAC#1 ($\Delta=0$), CAZAC#1 ($\Delta=1$), CAZAC#1 ($\Delta=2$), ..., and CAZAC#1 ($\Delta=L-1$) obtained by cyclically shifting the sequence CAZAC#1 form a group of L orthogonal sequences. Here, unlike normal orthogonal sequences, a sequence obtained by multiplying the sequence CAZAC#1 with a sequence length L by another sequence with the sequence length L loses characteristics of a CAZAC sequence. However, a sequence obtained by multiplying the entire sequence CAZAC#1 with a sequence length L by one factor retains characteristics of a CAZAC sequence.

In the example shown in FIG. 3, a sequence CAZAC#1 ($\Delta=\Delta_A$) and a sequence CAZAC#1 ($\Delta=\Delta_B$) obtained by cyclically shifting the same CAZAC sequence by different cyclic shift amounts are assigned to user A (UE_A) and user B (UE_B), respectively.

One CAZAC sequence is associated with one unit block. For example, a CAZAC sequence with a sequence length of 12 is associated with 12 symbol elements constituting a unit block.

In the example shown in FIG. 3(a), the acknowledgement information (ACK/NACK) to be reported from user A to the base station is represented by one or more of $d_{A1}$, $d_{A2}$, $d_{A3}$, and $d_{A4}$. For example, $d_{A1}=d_{A2}=d_{A3}=d_{A4}=1$ represents ACK and $d_{A1}=d_{A2}=d_{A3}=d_{A4}=-1$ represents NACK. However, the ACK/NACK may be represented by any other method.

In the example shown in FIG. 3(b), the acknowledgement information (ACK/NACK) to be reported from user B to the base station is represented by one or more of $d_{B1}$, $d_{B2}$, $d_{B3}$, and $d_{B4}$.

In the example shown in FIG. 3(c), the channel quality indicator (CQI) to be reported from user A to the base station is represented by one or more of $d_{A1}$, $d_{A2}$, $d_{A3}$, $d_{A4}$, and $d_{A5}$.

In the example shown in FIG. 3(d), the channel quality indicator (CQI) to be reported from user B to the base station is represented by one or more of $d_{B1}$, $d_{B2}$, $d_{B3}$, $d_{B4}$, and $d_{B5}$.

In reporting the ACK/NACK, using orthogonal CAZAC sequences makes it possible to code-division-multiplex a signal (a) of user A and a signal (b) of user B and maintain the orthogonality between the signals even when they are transmitted simultaneously using the same frequency. Also, in reporting the CQI, using orthogonal CAZAC sequences makes it possible to code-division-multiplex a signal (c) of user A and a signal (d) of user B and maintain the orthogonality between the signals even when they are transmitted simultaneously using the same frequency. Preferably, reference symbols may also be represented by CAZAC sequences. Accordingly, using orthogonal CAZAC sequences makes it possible to orthogonally multiplex signals even with different slot structures. For example, using orthogonal CAZAC sequences makes it possible to code-division-multiplex the signal (a) or (c) of user A and the signal (b) or (d) of user B and maintain the orthogonality between the signals even when they are transmitted simultaneously using the same frequency.

<Orthogonal Multiplexing Method Using Block Spreading Code Sequences>

Figure 4:
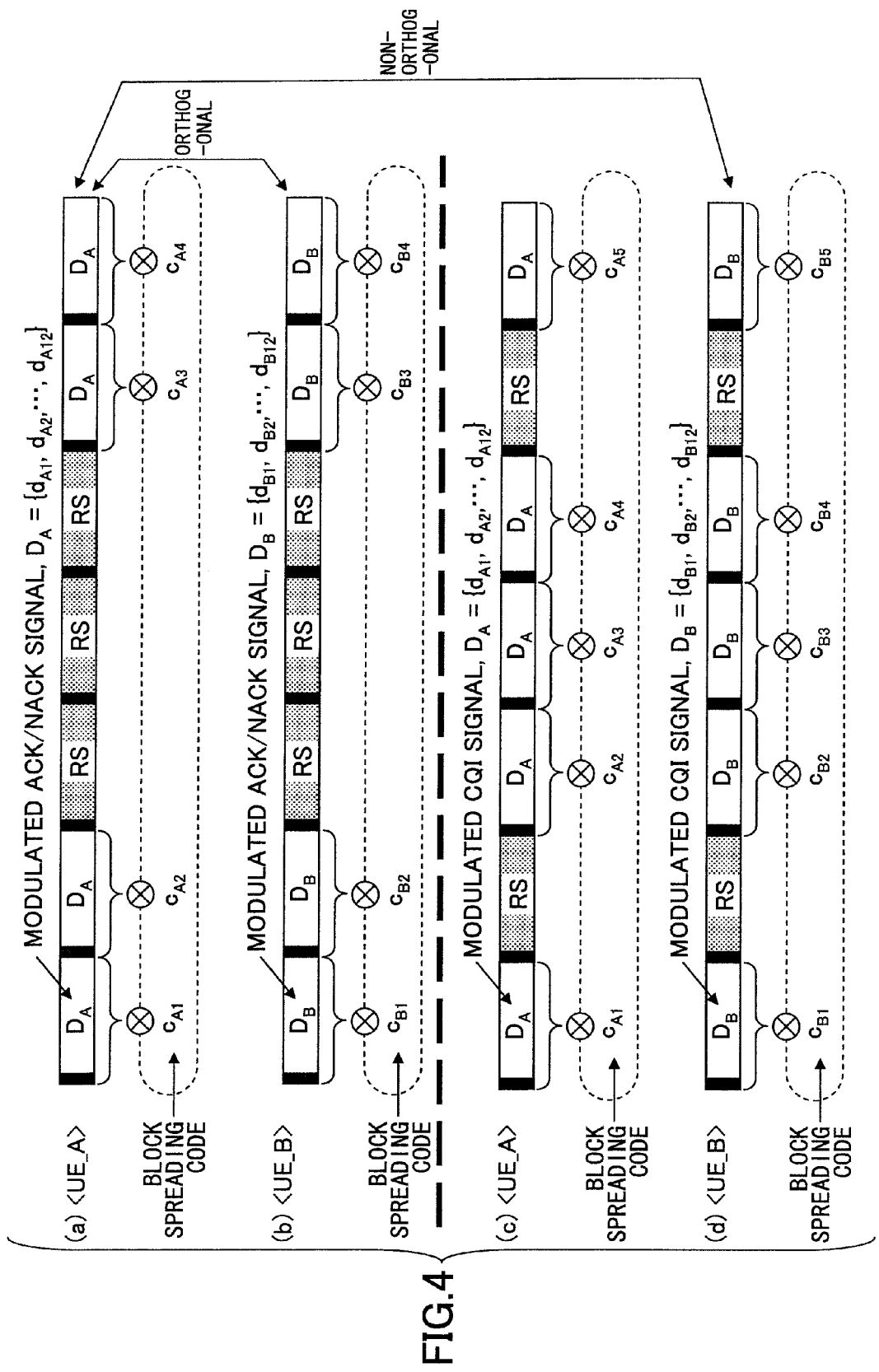
FIG. 4 is a drawing illustrating an orthogonal multiplexing method using block spreading code sequences.

FIG. 4 illustrates an orthogonal multiplexing method using block spreading code sequences. In this method, different from the method shown in FIG. 3, the acknowledgement information (ACK/NACK) ((a), (b)) and the channel quality indicator (CQI) ((c), (d)) are represented by unit blocks other than those containing reference symbols. In each slot, unit blocks other than those containing reference symbols contain the same information. A set of factors used to multiply the unit blocks containing the same information represents an orthogonal sequence.

In the example shown in FIG. 4(a), 12 symbol elements constituting each unit block $D_A$ represent a bit sequence representing the ACK/NACK of user A. In this example, the bit sequence $D_A=\{d_{A1}, d_{A2}, \ldots, d_{A12}\}$ representing the ACK/NACK has a length of 12. However, the ACK/NACK may be represented by any number of bits. In FIG. 4(a), four unit blocks indicated by $D_A$ represent the same information. The unit blocks $D_A$ are multiplied by a set of factors $C_{A1}$, $C_{A2}$, $C_{A3}$, and $C_{A4}$ representing an orthogonal sequence.

In the example shown in FIG. 4(b), 12 symbol elements constituting each unit block $D_B$ represent a bit sequence representing the ACK/NACK of user B. In FIG. 4(b), four unit blocks indicated by $D_B$ represent the same information. The unit blocks $D_B$ are multiplied by a set of factors $C_{B1}$, $C_{B2}$, $C_{B3}$, and $C_{B4}$ representing an orthogonal sequence. This method makes it possible to code-division-multiplex a signal (a) of user A and a signal (b) of user B and maintain the orthogonality between the signals even when they are transmitted simultaneously using the same frequency.

In the example shown in FIG. 4(c), 12 symbol elements constituting each unit block $D_A$ represent a bit sequence representing the CQI of user A. In this example, the bit sequence $D_A=\{d_{A1}, d_{A2}, \ldots, d_{A12}\}$ representing the CQI has a length of 12. However, the CQI may be represented by any number of bits. Generally, the CQI is represented by a value obtained by quantizing the reception quality SINR of a downlink reference symbol. The number of bits for representing the reception quality SINR and the number of quantization levels of the reception quality SINR may be set at any appropriate values. The user device may report a measured CQI itself to the base station or may report only some higher-order bits of the measured CQI. In FIG. 4(c), five unit blocks indicated by $D_A$ represent the same information. The unit blocks $D_A$ are multiplied by a set of factors $C_{A1}$, $C_{A2}$, $C_{A3}$, $C_{A4}$, and $CA_5$ representing an orthogonal sequence.

In the example shown in FIG. 4(d), 12 symbol elements constituting each unit block $D_B$ represent a bit sequence representing the CQI of user B. In FIG. 4(d), five unit blocks indicated by $D_B$ represent the same information. The unit blocks $D_B$ are multiplied by a set of factors $C_{B1}$, $C_{B2}$, $C_{B3}$, $C_{B4}$, and $CB_5$ representing an orthogonal sequence. This method makes it possible to code-division-multiplex a signal (c) of user A and a signal (d) of user B and maintain the orthogonality between the signals even when they are transmitted simultaneously using the same frequency.

<Orthogonal Multiplexing Method Using CAZAC Sequences and Block Spreading Code Sequences>

Figure 5:
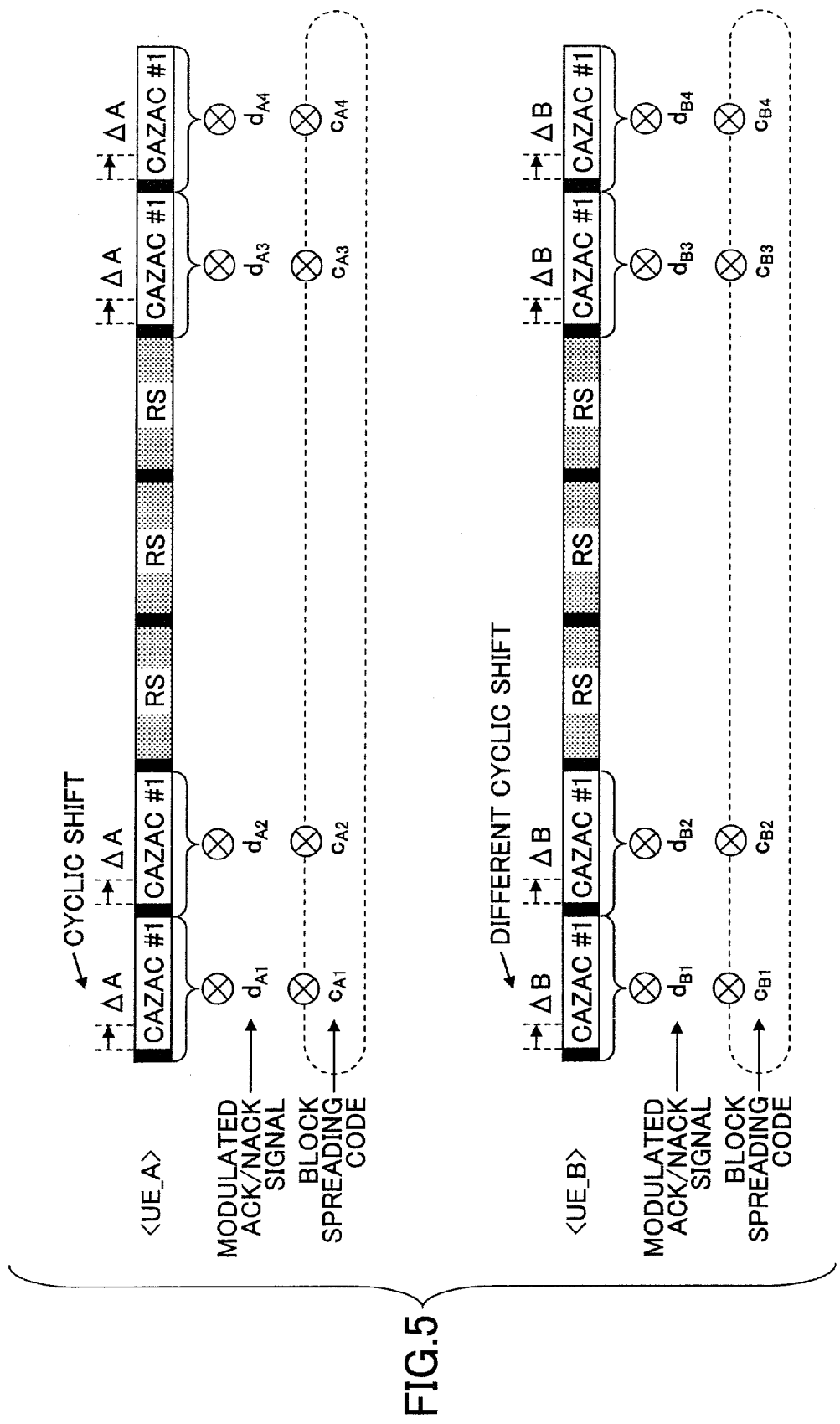
FIG. 5 is a drawing illustrating an orthogonal multiplexing method using CAZAC sequences and block spreading code sequences.

As exemplified in FIG. 5, it is possible to combine the orthogonal multiplexing method using CAZAC sequences shown in FIG. 3 and the orthogonal multiplexing method using block spreading code sequences shown in FIG. 4.

Reference symbols used in FIG. 5 are the same as those used in FIGS. 3 and 4. In this method, control information (in this example, ACK/NACK) is represented by one or more factors used to multiply unit blocks. This method makes it possible to take advantage of the orthogonality provided by CAZAC sequences as well as the orthogonality provided by block spreading code sequences, and thereby makes it possible to more easily and effectively separate user signals. This in turn makes it possible to further improve the reception quality of control information.

<Appropriate Orthogonal Multiplexing Methods>

FIG. 6 shows orthogonal multiplexing methods used to multiplex multiple user signals in the PUCCH. As described above, the PUCCH is used mainly to transmit the acknowledgement information (ACK/NACK) and/or the channel quality indicator (CQI).

The acknowledgement information (ACK/NACK) indicates whether a physical downlink shared channel has been properly received and is particularly important in retransmission control. The retransmission control directly influences the system throughput and therefore it is preferable to transmit the acknowledgement information with high quality. The acknowledgement information represents either acknowledgement (ACK) or negative acknowledgement (NACK) and can be basically represented by one bit. Therefore, rather than increasing the error correction coding gain by increasing the redundancy, improving the orthogonality of the acknowledgement information may better improve its quality. For this reason, in this embodiment, a combination of the orthogonal multiplexing method using cyclically-shifted CAZAC sequences and the orthogonal multiplexing method using block spreading code sequences (FIG. 5) is used as a user multiplexing method for the acknowledgement information (ACK/NACK).

As a user multiplexing method for the channel quality indicator (CQI), either the orthogonal multiplexing method using cyclically-shifted CAZAC sequences or the orthogonal multiplexing method using block spreading code sequences is used depending on the system bandwidth. This embodiment is greatly different from related-art methods in that one of the multiplexing methods is selected depending on the system bandwidth.

When transmitting multi-bit information, it is generally preferable to increase the error correction coding gain to increase cell coverage. This is because desired quality can be achieved with low transmission power if the error correction coding gain is high, but high transmission power is necessary to achieve the desired quality if the error correction coding gain is low. Below, multiplexing methods using CAZAC sequences and block spreading code sequences are compared in terms of the error correction coding gain.

In the multiplexing method using CAZAC sequences (FIG. 3), the channel quality indicator (CQI) is represented by factors used to multiply unit blocks. The number of unit blocks usable for transmission of the CQI is 5 in one slot and 10 in one subframe. Therefore, 10 factors ($d_1, \ldots, d_{10}$) are usable to transmit a CQI. Assuming that one factor corresponds to two bits (QPSK), 10×2=20 bits can be used in one subframe.

In the multiplexing method using block spreading code sequences (FIG. 4), the channel quality indicator (CQI) is represented by symbol elements in unit blocks. One slot includes one type of unit blocks and one subframe includes two types of unit blocks (i.e., one subframe includes two sets of five unit blocks and each set of five unit blocks contains the same information). One unit block includes 12 symbol elements. Therefore, 2 types×12/per unit block=24 symbol elements can be used to represent the CQI. Assuming that one symbol element corresponds to two bits (QPSK), 24×2=48 bits can be used in one subframe.

Assuming that 10 bits are necessary to represent the CQI, the coding gain is 20/10=2.0 with the multiplexing method using CAZAC sequences. Meanwhile, the coding gain is 48/10=4.8 with the multiplexing method using block spreading code sequences. Judging from these exemplary calculations, the multiplexing method using block spreading code sequences is more preferable than the multiplexing method using CAZAC sequences in terms of the coding gain (or in terms of improving the reliability).

With the multiplexing method using block spreading code sequences, user signals become orthogonal to each other if the same subframe structure is used ((a) and (b), or (c) and (d) in FIG. 4). With this method, however, user signals with different subframe structures ((a) and (d), or (b) and (c) in FIG. 4) do not become orthogonal to each other. In this sense, the multiplexing method using block spreading code sequences is different from the multiplexing method using CAZAC sequences. Accordingly, with the orthogonal multiplexing method using block spreading code sequences, it is preferable not to transmit signals with different subframe structures at the same time using the same frequency. For this reason, in this embodiment, a slot for transmitting the CQI and a slot for transmitting the ACK/NACK are separately provided, as shown in the right side of FIG. 7, when the multiplexing method using block spreading code sequences is used so that the CQI and the ACK/NACK are not transmitted at the same time using the same frequency.

By the way, the system bandwidth is not the same in all areas, i.e., one area uses a wide system bandwidth and another area uses a narrow system bandwidth. When the system bandwidth is wide enough to separately provide a slot for transmitting the CQI and a slot for transmitting the ACK/NACK in the PUCCH, the multiplexing method as described above is preferable. However, to separately provide a slot for transmitting the CQI and a slot for transmitting the ACK/NACK in the PUCCH, it is necessary, for example, to reserve two resource blocks (right and left resource blocks) of frequency band dedicated for the PUCCH as shown in the right side of FIG. 7.

Figure 7:
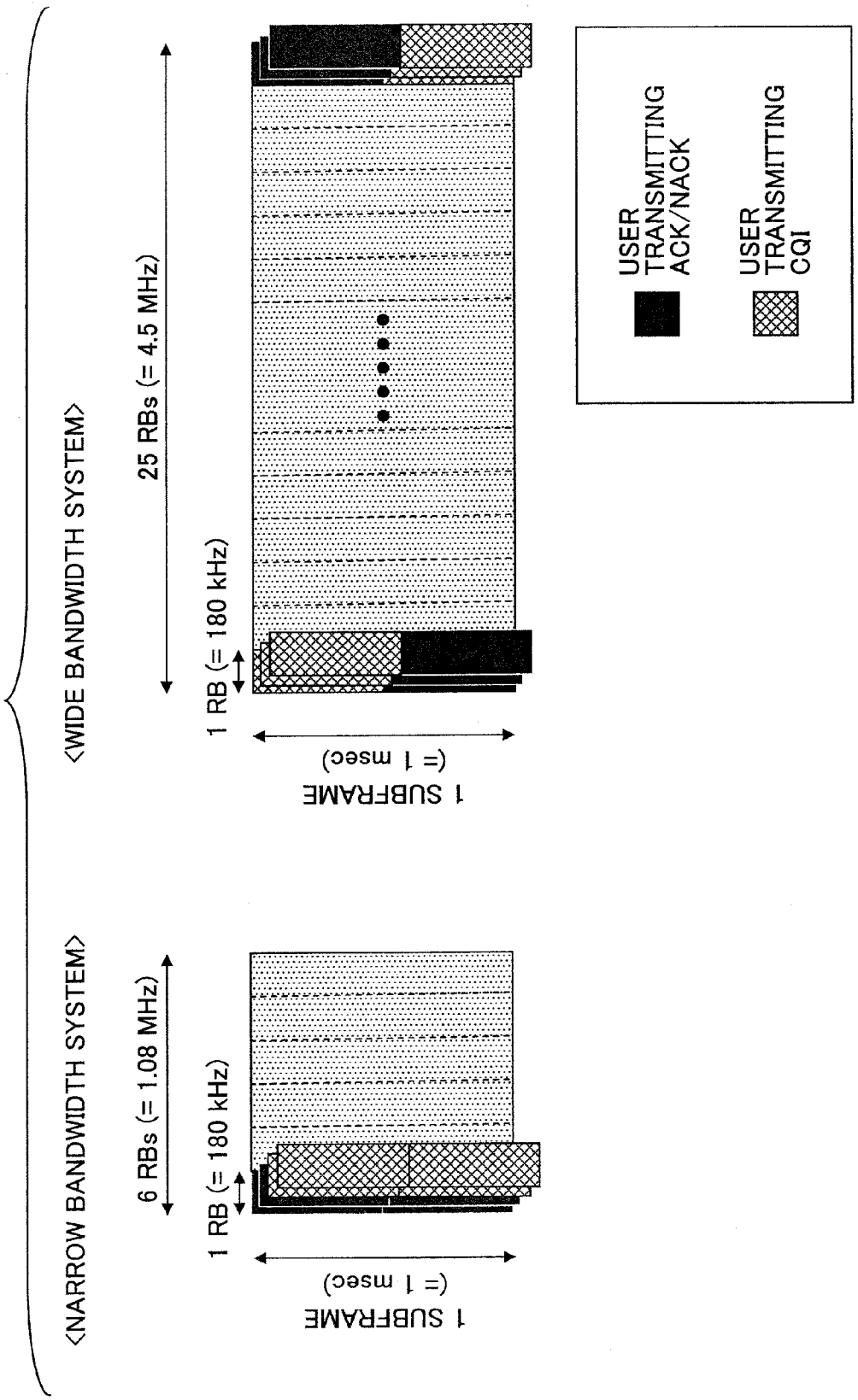
FIG. 7 is a drawing illustrating a case where different multiplexing methods are used according to system bandwidths.

If the system frequency band includes as many as 25 resource blocks as shown in the right side of FIG. 7, a sufficient amount of resources are left for the physical uplink shared channel (PUSCH) even if two resource blocks are allocated to the PUCCH. However, there is a case where the system frequency band includes, for example, only six resource blocks as shown in the left side of FIG. 7. In this case, if two out of six resource blocks are allocated to the PUCCH, the allocated resource blocks amount to one third (⅔) of the all resources. This is not preferable in terms of improving the throughput of the physical uplink shared channel.

For this reason, in this embodiment, user signals for transmitting CQIs are multiplexed using CAZAC sequences if the system bandwidth is comparatively narrow. As described above, the multiplexing method using CAZAC sequences makes it possible to orthogonally multiplex user signals even if they have different subframe structures and therefore makes it possible to transmit the user signals at the same time using the same dedicated frequency band as shown in the left side of FIG. 7. With this method, only one out of six resource blocks has to be allocated to the PUCCH. Whether a system bandwidth is wide or narrow may be determined by any appropriate method. For example, whether a system bandwidth is wide or narrow may be determined by comparing the system bandwidth with a threshold and an orthogonal multiplexing method may be selected based on the determination result.

In this embodiment, for the reasons as described above, different orthogonal multiplexing methods are selected based on criteria as shown in FIG. 6. Here, the criteria related to the coding gain may be influenced by subframe structures and unit block structures. For this reason, an orthogonal multiplexing method for multiplexing CQI signals may be determined taking into account relationships between a number of unit blocks $N_{Block}$ (used for the CQI) in one subframe, a number of slots $N_{slot}$ in one subframe, and a number of symbol elements $N_{element}$ constituting a unit block. For example, when $N_{Block}<N_{slot}\times N_{element}$ and the system bandwidth is wide, it is preferable to use the orthogonal multiplexing method using block spreading code sequences as shown in FIG. 6. With the numerical examples described above, this relational expression is satisfied (10<2×12). Meanwhile, when $N_{Block}>N_{slot}\times N_{element}$, it may be preferable to use the orthogonal multiplexing method using CAZAC sequences regardless of whether the system bandwidth is wide or narrow. For example, this relational expression is satisfied when the number of symbol elements $N_{element}$ constituting a unit block is 4 (10>2×4).

If the number of symbol elements $N_{element}$ constituting a unit block is 5, it is not possible to select an orthogonal multiplexing method based on the coding gain. In this case, it is preferable to select an orthogonal multiplexing method based on another criterion.

<User Device>

Figure 8:
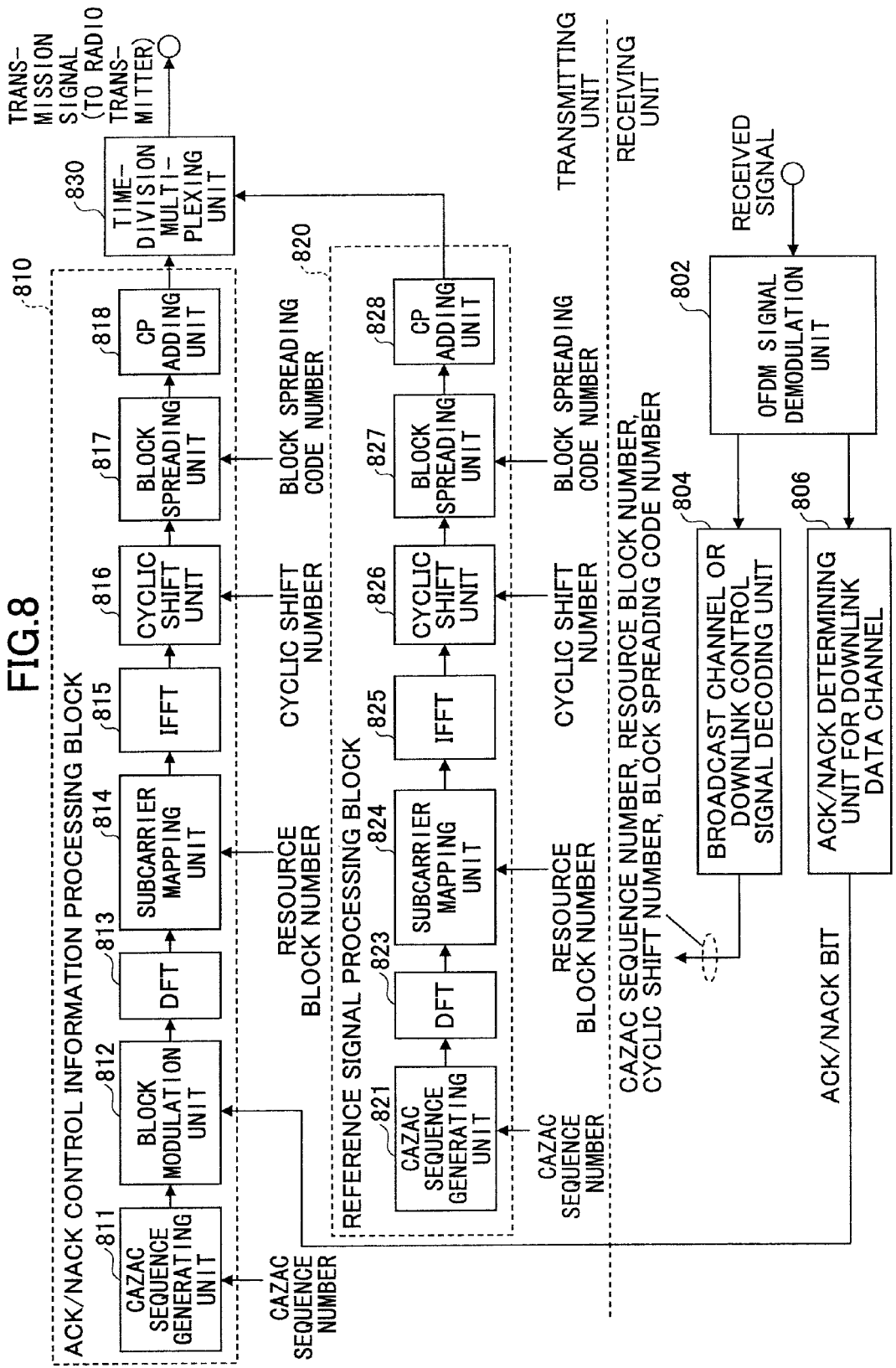
FIG. 8 is a block diagram of a user device transmitting ACK/NACK via a PUCCH according to an embodiment of the present invention.
Figure 9:
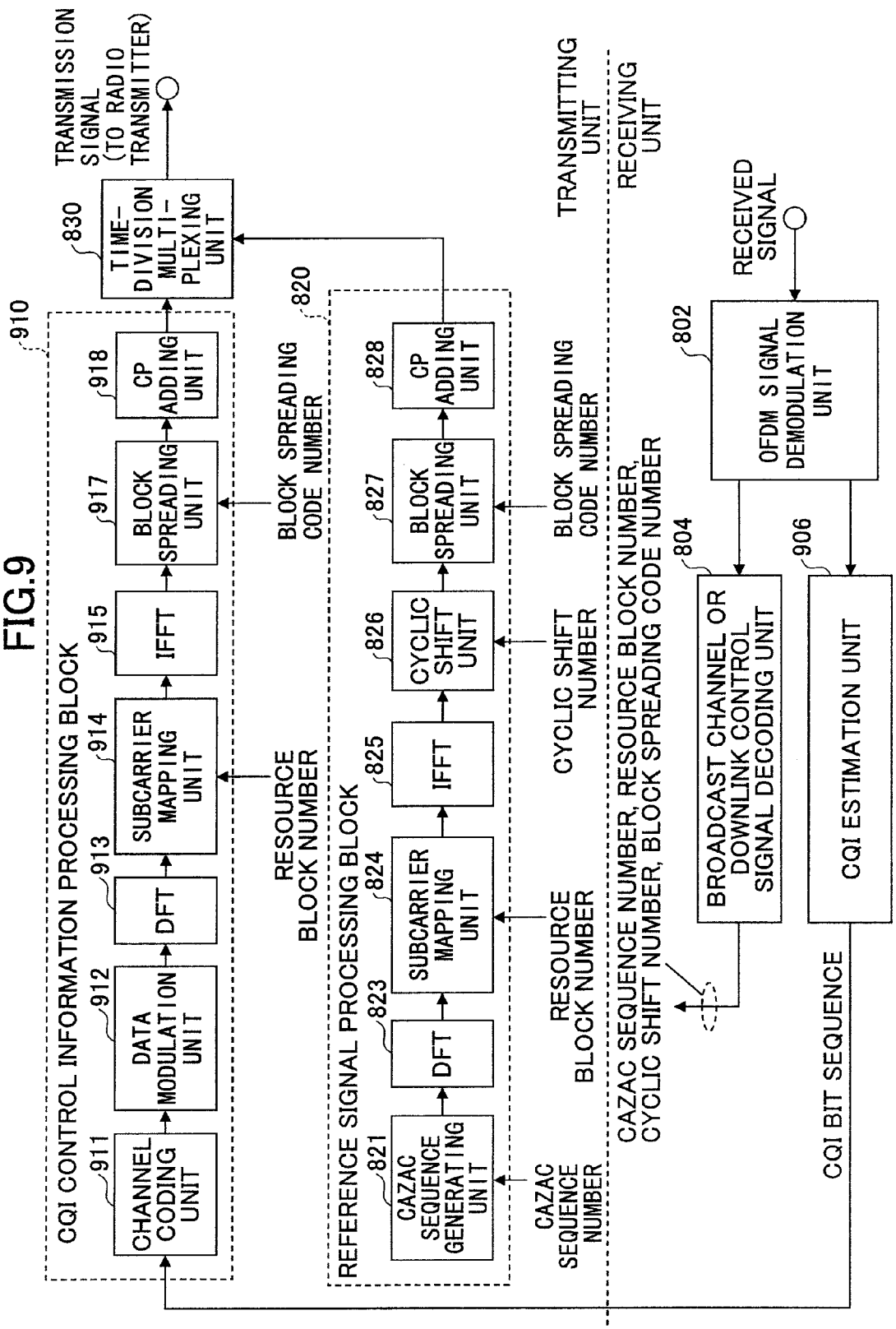
FIG. 9 is a block diagram of a user device transmitting a CQI via a PUCCH according to an embodiment of the present invention.

FIGS. 8 and 9 are functional block diagrams of a user device according to an embodiment of the present invention. FIG. 8 shows the user device transmitting control information indicating the ACK/NACK via the PUCCH. FIG. 9 shows the user device transmitting the CQI via the PUCCH. FIGS. 8 and 9 do not represent separate user devices. The user device of this embodiment includes both functions for processing the acknowledgement information and for processing the channel quality indicator. Configurations corresponding to these functions are shown in separate FIGS. 8 and 9 simply for illustrative purposes. In FIGS. 8 and 9, the same reference numbers are used for the corresponding components. Each of the functional blocks or components shown in FIGS. 8 and 9 may be implemented by hardware, software, or a combination of them.

As shown in FIG. 8, the user device includes an OFDM signal demodulation unit 802, a downlink control signal decoding unit 804, an ACK/NACK determining unit 806, an ACK/NACK control information processing block 810, a reference signal processing block 820, and a time-division multiplexing unit 830. The ACK/NACK control information processing block 810 includes a CAZAC sequence generating unit 811, a block modulation unit 812, a discrete Fourier transform unit 813, a subcarrier mapping unit 814, an inverse fast Fourier transform unit 815, a cyclic shift unit 816, a block spreading unit 817, and a CP adding unit 818. The reference signal processing block 820 includes a CAZAC sequence generating unit 821, a discrete Fourier transform unit 823, a subcarrier mapping unit 824, an inverse fast Fourier transform unit 825, a cyclic shift unit 826, a block spreading unit 827, and a CP adding unit 828.

The OFDM signal demodulation unit 802 demodulates a received OFDM-modulated signal, and extracts a broadcast channel, a downlink control channel (L1/L2 control channel), and a physical downlink shared channel (PDSCH) from the demodulated signal.

The downlink control signal decoding unit 804 decodes information in the broadcast channel and/or the L1/L2 control channel and thereby obtains information regarding the PUCCH. The information regarding the PUCCH may include a sequence number of a CAZAC sequence assigned to the user device, a cyclic shift amount of the CAZAC sequence, a resource block number, and information indicating a block spreading code sequence.

The ACK/NACK determining unit 806 determines whether the physical downlink shared channel (PDSCH) is correctly received and if an error is found, determines whether the error is within an allowable range. The ACK/HACK determining unit 806 outputs the determination result as acknowledgement information indicating either acknowledgement (ACK) or negative acknowledgement (NACK). The negative acknowledgement results in retransmission of a packet in the retransmission control. The acknowledgement information (ACK/NACK) can be basically represented by one bit. However, two or more bits may be used to represent the acknowledgement information. Here, for descriptive purposes, it is assumed that the ACK/NACK is represented by a bit sequence $d_1, d_2, \ldots,$ and $d_8$.

The ACK/NACK control information processing block 810 performs processing for including the acknowledgement information (ACK/NACK) in the PUCCH. In this embodiment, multiple sets of control information indicating the ACK/NACK of users are orthogonally multiplexed using both CAZAC sequences and block spreading code sequences.

The CAZAC sequence generating unit 811 generates a CAZAC sequence assigned to the user device. The CAZAC sequence is specified by a sequence number.

The block modulation unit 812 multiplies a predetermined number of codes constituting the CAZAC sequence by the same factor di (i=1, 2, . . . ) to prepare one unit block and repeats this process for a predetermined number of times to prepare unit blocks in one subframe. Each of the codes constituting the CAZAC sequence corresponds to a symbol element.

The discrete Fourier transform unit 813 performs discrete Fourier transformation on an input signal and thereby transforms the signal into a frequency domain signal.

The subcarrier mapping unit 814 maps the frequency domain signal to a frequency band of a specified resource block.

The inverse fast Fourier transform unit 815 performs inverse-fast-Fourier transformation on an input signal and thereby transforms the signal into a time domain signal.

The cyclic shift unit 816 cyclically shifts the time domain signal constituting the unit blocks by a specified cyclic shift amount to change the order of codes (symbol elements) in the unit blocks.

The block spreading unit 817 multiplies the N unit blocks by a spreading code sequence having a sequence length N. For example, if one slot includes four unit blocks for the ACK/NACK, the block spreading unit 817 multiplies the four unit blocks by a spreading code sequence with a sequence length of 4. Here, each code in the spreading code sequence corresponds to one unit block.

The CP adding unit 818 generates cyclic prefixes (CP) and attaches them to an input signal.

The reference signal processing block 820 performs processing for including a reference signal in the PUCCH.

The CAZAC sequence generating unit 821 generates a CAZAC sequence assigned to the user device. The CAZAC sequence is specified by a sequence number.

The discrete Fourier transform unit 823 performs discrete Fourier transformation on an input signal and thereby transforms the signal into a frequency domain signal.

The subcarrier mapping unit 824 maps the frequency domain signal to a frequency band of a specified resource block.

The inverse fast Fourier transform unit 825 performs inverse-fast-Fourier transformation on an input signal and thereby transforms the signal into a time domain signal.

The cyclic shift unit 826 cyclically shifts the time domain signal constituting the unit blocks by a specified cyclic shift amount to change the order of codes (symbol elements) in the unit blocks.

The block spreading unit 827 multiplies the $N_{RS}$ unit blocks by a spreading code sequence having a sequence length $N_{RS}$. Here, each code in the spreading code sequence corresponds to one unit block.

The CP adding unit 828 generates cyclic prefixes (CP) and attaches them to an input signal.

The time-division multiplexing unit 830 time-division-multiplexes the signal indicating the ACK/NACK and the reference signal and inputs the multiplexed signal to a radio transmitter (not shown).

As shown in FIG. 9, the user device further includes a CQI estimation unit 906 and a CQI control information processing block 910. In this embodiment, when the system bandwidth is wide, multiple sets of control information indicating CQIs of users are orthogonally multiplexed using block spreading code sequences. Meanwhile, when the system bandwidth is narrow, multiple sets of control information indicating CQIs of users are orthogonally multiplexed using CAZAC sequences.

The CQI estimation unit 906 measures the reception quality SINR of a downlink reference symbol and obtains a CQI by determining a CQI level the measured SINR belongs to. The CQI estimation unit 906 outputs a bit sequence representing the obtained CQI to the CQI control information processing block 910.

The CQI control information processing block 910 performs processing for including the CQI in the PUCCH.

A channel coding unit 911 performs error correction coding on the bit sequence representing the CQI.

A data modulation unit 912 data-modulates the error-correction-coded bit sequence. Here, it is assumed that a channel coding scheme and a data modulation scheme are reported in advance from the base station to the user device.

A discrete Fourier transform unit 913 performs discrete Fourier transformation on an input signal and thereby transforms the signal into a frequency domain signal.

A subcarrier mapping unit 914 maps the frequency domain signal to a frequency band of a specified resource block.

An inverse fast Fourier transform unit 915 performs inverse-fast-Fourier transformation on an input signal and thereby transforms the signal into a time domain signal.

A block spreading unit 917 multiplies N unit blocks by a spreading code sequence having a sequence length N. Here, each code in the spreading code sequence corresponds to one unit block.

A CP adding unit 918 generates cyclic prefixes (CP) and attaches them to an input signal.

As described above and shown in FIG. 6, when the system bandwidth is comparatively narrow, channel quality indicators (CQI) of multiple users are orthogonally multiplexed by using CAZAC sequences. In this case, the CQI control information processing block 910 may have a configuration similar to that of the reference signal processing block 820.

<Base Station>

Figure 10:
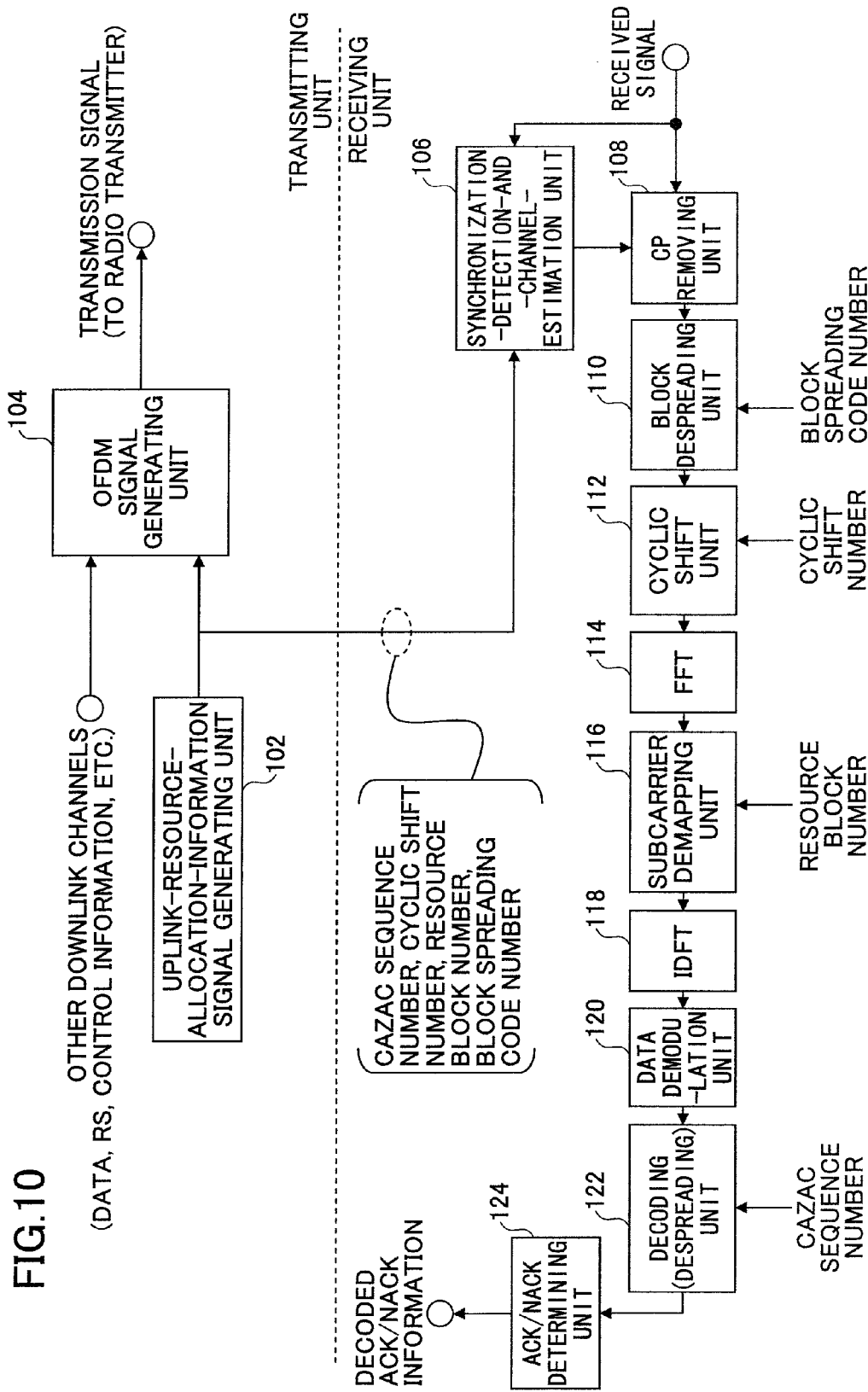
FIG. 10 is a block diagram of a base station receiving ACK/NACK via a PUCCH according to an embodiment of the present invention.
Figure 11:
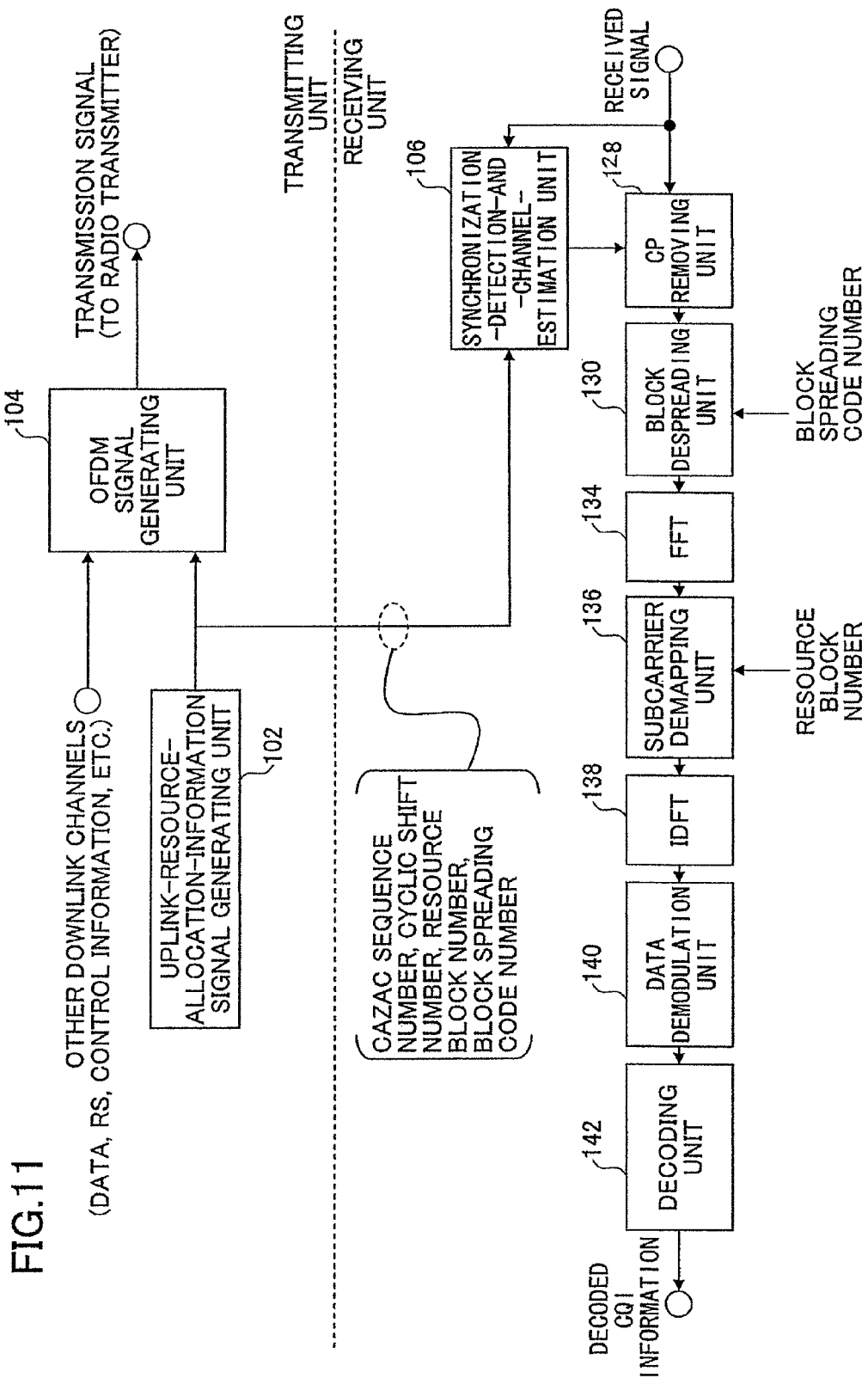
FIG. 11 is a block diagram of a base station receiving a CQI via a PUCCH according to an embodiment of the present invention.

FIGS. 10 and 11 are functional block diagrams of a base station according to an embodiment of the present invention. FIG. 10 shows the base station receiving control information indicating the ACK/NACK via the PUCCH. FIG. 11 shows the base station receiving control information indicating the CQI via the PUCCH. FIGS. 10 and 11 do not represent separate base stations. The base station of this embodiment includes both functions for processing the acknowledgement information and for processing the channel quality indicator. Configurations corresponding to these functions are shown in separate FIGS. 10 and 11 simply for illustrative purposes. In FIGS. 10 and 11, the same reference numbers are used for the corresponding components. Each of the functional blocks or components shown in FIGS. 10 and 11 may be implemented by hardware, software, or a combination of them.

As shown in FIG. 10, the base station includes an uplink-resource-allocation-information signal generating unit 102, an OFDM signal generating unit 104, a synchronization-detection-and-channel-estimation unit 106, a CP removing unit 108, a block despreading unit 110, a cyclic shift unit 112, a fast Fourier transform unit 114, a subcarrier demapping unit 116, an inverse discrete Fourier transform unit 118, a data demodulation unit 120, a decoding unit 122, and an ACK/NACK determining unit 124.

The uplink-resource-allocation-information signal generating unit 102 generates information necessary for the user device to transmit the physical uplink control channel (PUCCH) and inputs the information to the OFDM signal generating unit 104. The information necessary to transmit the PUCCH may include a sequence number identifying a CAZAC sequence, a cyclic shift amount of the CAZAC sequence, a resource block number, and information indicating a block spreading code sequence.

The OFDM signal generating unit 104 generates a downlink transmission signal and inputs the downlink transmission signal to a radio transmitter (not shown).

The synchronization-detection-and-channel-estimation unit 106 performs synchronization detection and channel estimation based of a reference symbol (RS) in a received uplink signal.

The CP removing unit 108 removes cyclic prefixes from the received signal, thereby extracts an effective signal component excluding a redundant component, and identifies multiple unit blocks.

The block despreading unit 110 despreads the identified unit blocks by multiplying the unit blocks by block spreading codes.

The cyclic shift unit 112 cyclically shifts the order of codes in the unit blocks by a cyclic shift amount assigned to the user device transmitting the PUCCH. The direction of cyclic shift is opposite to the direction of cyclic shift at the user device. Thus, the cyclic shift unit 112 converts the codes into an original information sequence or bit sequence that is not cyclically shifted.

The fast Fourier transform unit 114 performs first Fourier transformation on the information sequence and thereby transforms the information sequence into a frequency domain signal.

The subcarrier demapping unit 116 extracts a resource block of the PUCCH from the frequency domain signal.

The inverse discrete Fourier transform unit 118 performs inverse discrete Fourier transformation on the extracted signal to transform the signal back into a time domain signal.

The data demodulation unit 120 identifies unit blocks including a data sequence $d_1, d_2, \ldots,$ and $d_8$ indicating either ACK or NACK.

The decoding unit 122 multiplies each of the unit blocks by a CAZAC sequence to obtain the data sequence $d_1, d_2, \ldots,$ and $d_8$ transmitted from the user device.

The ACK/NACK determining unit 124 analyses a bit sequence of the obtained data sequence, and thereby determines whether the bit sequence indicates ACK or NACK. The determination result is used to determine whether to perform retransmission. If retransmission is necessary, a packet to be retransmitted is identified and the identified packet is included again in the PDSCH by the OFDM signal generating unit 104. If retransmission is not necessary, the next signal is transmitted.

As shown in FIG. 11, the base station further includes a CP removing unit 128, a block despreading unit 130, a fast Fourier transform unit 134, a subcarrier demapping unit 136, an inverse discrete Fourier transform unit 138, a data demodulation unit 140, and a decoding unit 142.

The CP removing unit 128 removes cyclic prefixes from a received signal, thereby extracts an effective signal component excluding a redundant component, and identifies multiple unit blocks.

The block despreading unit 130 despreads the identified unit blocks by multiplying the unit blocks by block spreading codes.

The fast Fourier transform unit 134 performs first Fourier transformation on an information sequence in the unit blocks and thereby transforms the information sequence into a frequency domain signal.

The subcarrier demapping unit 136 extracts a resource block of the PUCCH from the frequency domain signal.

The inverse discrete Fourier transform unit 138 performs inverse discrete Fourier transformation on the extracted signal to transform the signal back into a time domain signal.

The data demodulation unit 140 identifies unit blocks including a data sequence indicating the CQI and obtains a bit sequence represented by a code sequence in the unit blocks.

The decoding unit 142 obtains the value of the CQI from the obtained bit sequence. The value of the CQI is used, for example, for downlink scheduling as needed.

INDUSTRIAL APPLICABILITY

In the above embodiments, an LTE system is used as an example. However, the present invention may be applied to any appropriate mobile communication system where multiple sets of control information (CQI) of users are orthogonally multiplexed using block spreading code sequences for transmission.

The present invention is not limited to the specifically disclosed embodiments, and variations and modifications may be made without departing from the scope of the present invention. Although specific values are used in the above descriptions to facilitate the understanding of the present invention, the values are just examples and different values may also be used unless otherwise mentioned. The distinctions between the embodiments are not essential for the present invention, and the embodiments may be used individually or in combination. Also, a subject matter described in one embodiment may be applied to a subject matter in another embodiment unless they are contradictory. Although functional block diagrams are used to describe apparatuses in the above embodiments, the apparatuses may be implemented by hardware, software, or a combination of them.

The present international application claims priority from Japanese Patent Application No. 2007-282441 filed on Oct. 30, 2007, the entire contents of which are hereby incorporated herein by reference.

The invention claimed is:

1. A user device transmitting at least an uplink control channel using a single carrier scheme, comprising:
   a channel quality indicator generating unit configured to generate a channel quality indicator indicating a downlink radio propagation condition; and
   a transmitting unit configured to transmit the uplink control channel including the channel quality indicator using a dedicated frequency band when no radio resource is allocated for transmission of an uplink data channel,
   wherein the transmitting unit is configured to transmit a predetermined number of unit blocks in each slot period,
   when a system bandwidth is greater than a predetermined value, a first orthogonal multiplexing method is used wherein:
      a first orthogonal sequence is represented by a first set of factors multiplied by a plurality of unit blocks, each unit block belonging to a same slot and containing same information, and
      at least a part of the channel quality indicator is represented by a predetermined number of symbol elements constituting each of the unit blocks, and
   when the system bandwidth is less than or equal to the predetermined value, a second orthogonal multiplexing method is used wherein:
      a second orthogonal sequence having a predetermined length multiplied by a factor from a second set of factors is represented by the predetermined number of symbol elements constituting each of a plurality of unit blocks, and
      at least a part of the channel quality indicator is represented by a second set of factors multiplied by a plurality of unit blocks.

2. The user device as claimed in claim 1, wherein the second orthogonal sequence is a CAZAC sequence.

3. The user device as claimed in claim 1, wherein when the system bandwidth is greater than the predetermined value, acknowledgement information indicating acknowledgement or negative acknowledgement for a downlink data channel is transmitted in a slot different from another slot where the channel quality indicator is transmitted.

4. The user device as claimed in claim 3, wherein
   a set of the first factors used to multiply the some of the unit blocks represents the acknowledgement information,
   a set of the second factors used to multiply the some of the unit blocks belonging to a same slot and containing same information represents an orthogonal sequence, and
   a predetermined number of symbol elements constituting each of some of the unit blocks represent a sequence obtained by multiplying an entire orthogonal sequence having a predetermined length by a first factor and a second factor.

5. The user device as claimed in claim 4, wherein the orthogonal sequence is a CAZAC sequence.

6. The user device as claimed in claim 1, wherein a reference symbol is transmitted at least in one of the unit blocks in each slot period.

7. The user device as claimed in claim 6, wherein the reference symbol is represented by a CAZAC sequence.

8. The user device as claimed in claim 6, wherein a structure of a slot including unit blocks for the channel quality indicator and the reference symbol is different from a structure of another slot including unit blocks for acknowledgement information and the reference symbol.

9. A method of transmitting at least an uplink control channel using a single carrier scheme, the method comprising the steps of:
   generating a channel quality indicator indicating a downlink radio propagation condition; and
   transmitting the uplink control channel including the channel quality indicator using a dedicated frequency band when no radio resource is allocated for transmission of an uplink data channel,
   wherein in the transmitting step, a predetermined number of unit blocks are transmitted in each slot period;
   the method further comprising:
   using a first orthogonal multiplexing method, when a system bandwidth is greater than a predetermined value, where a set of factors used to multiply some of the unit blocks belonging to a same slot and containing same information represents a first orthogonal sequence, and a predetermined number of symbol elements constituting each of the some of the unit blocks represent at least a part of the channel quality indicator, and
   using a second orthogonal multiplexing method, when the system bandwidth is less than or equal to the predetermined value, where a set of first factors used to multiply the some of the unit blocks represents at least a part of the channel quality indicator, and the predetermined number of symbol elements constituting each of the some of the unit blocks represent a sequence obtained by multiplying an entire second orthogonal sequence having a predetermined length by a first factor from the set of first factors.

10. A base station receiving at least an uplink control channel using a single carrier scheme, comprising:
    a receiving unit configured to receive the uplink control channel including a channel quality indicator using a dedicated frequency band when no radio resource is allocated for transmission of an uplink data channel; and
    an extracting unit configured to extract the channel quality indicator indicating a downlink radio propagation condition from the uplink control channel,
    wherein the receiving unit is configured to receive a predetermined number of unit blocks in each slot period,
    wherein the extracting unit is further configured to extract the channel quality indicator according to a first orthogonal multiplexing method,
    wherein the first orthogonal multiplexing method comprises, when a system bandwidth is greater than a predetermined value, a set of factors used to multiply some of the unit blocks belonging to a same slot and containing same information represents a first orthogonal sequence, and a predetermined number of symbol elements constituting each of the some of the unit blocks represent at least a part of the channel quality indicator, and a second orthogonal multiplexing method where, when the system bandwidth is less than or equal to the predetermined value, a set of first factors used to multiply the some of the unit blocks represents at least a part of the channel quality indicator, and the predetermined number of symbol elements constituting each of the some of the unit blocks represent a sequence obtained by multiplying an entire second orthogonal sequence having a predetermined length by a first factor from the set of first factors.

11. The base station as claimed in claim 10, wherein the second orthogonal sequence is a CAZAC sequence.

12. The base station as claimed in claim 10, wherein when the system bandwidth is greater than the predetermined value, the extracting unit is further configured to extract acknowledgement information indicating acknowledgement or negative acknowledgement for a downlink data channel which is transmitted in a slot different from another slot where the channel quality indicator is transmitted.

13. The base station as claimed in claim 12, wherein
the extracting unit is further configured to extract acknowledgement information indicating acknowledgement or negative acknowledgement according to an orthogonal multiplexing method where a set of first factors used to multiply the some of the unit blocks represents the acknowledgement information;
a set of second factors used to multiply the some of the unit blocks belonging to a same slot and containing same information represents an orthogonal sequence; and
a predetermined number of symbol elements constituting each of some of the unit blocks represent a sequence obtained by multiplying an entire orthogonal sequence having a predetermined length by a first factor from the set of first factors and a second factor from the set of second factors.

14. The base station as claimed in claim 13, wherein the orthogonal sequence represented by the predetermined number of symbol elements is a CAZAC sequence.

15. The base station as claimed in claim 10, wherein the receiving unit is further configured to receive a reference symbol transmitted at least in one of the unit blocks in each slot period.

16. The base station as claimed in claim 15, wherein the reference symbol is represented by a CAZAC sequence.

17. The base station as claimed in claim 15, wherein a structure of a slot including unit blocks for the channel quality indicator and the reference symbol is different from a structure of another slot including unit blocks for acknowledgement information and the reference symbol.

18. A method of receiving at least an uplink control channel using a single carrier scheme, the method comprising the steps of:
receiving the uplink control channel including a channel quality indicator using a dedicated frequency band when no radio resource is allocated for transmission of an uplink data channel, and
extracting the channel quality indicator indicating a downlink radio propagation condition from the uplink control channel,
wherein in the receiving step, a predetermined number of unit blocks are received in each slot period;

wherein the extracting the channel quality indicator is performed according to a first orthogonal multiplexing method, wherein the first orthogonal multiplexing method comprises, when a system bandwidth is greater than a predetermined value, a set of factors used to multiply some of the unit blocks belonging to a same slot and containing same information represents a first orthogonal sequence, and a predetermined number of symbol elements constituting each of the some of the unit blocks represent at least a part of the channel quality indicator, and a second orthogonal multiplexing method where, when the system bandwidth is less than or equal to the predetermined value, a set of first factors used to multiply the some of the unit blocks represents at least a part of the channel quality indicator, and the predetermined number of symbol elements constituting each of the some of the unit blocks represent a sequence obtained by multiplying an entire second orthogonal sequence having a predetermined length by a first factor from the set of first factors.

19. A mobile communication system where at least an uplink control channel is transmitted using a single carrier scheme, comprising:
at least one user device comprising:
a channel quality indicator generating unit configured to generate a channel quality indicator indicating a downlink radio propagation condition, and
a transmitting unit configured to transmit the uplink control channel including the channel quality indicator using a dedicated frequency band when no radio resource is allocated for transmission of an uplink data channel,
wherein the transmitting unit is configured to transmit a predetermined number of unit blocks in each slot period,
wherein a first orthogonal multiplexing method is used, when a system bandwidth is greater than a predetermined value, where a set of factors used to multiply some of the unit blocks belonging to a same slot and containing same information represents a first orthogonal sequence, and a predetermined number of symbol elements constituting each of the some of the unit blocks represent at least a part of the channel quality indicator, and
wherein a second orthogonal multiplexing method is used, when the system bandwidth is less than or equal to the predetermined value, where a set of first factors used to multiply the some of the unit blocks represents at least a part of the channel quality indicator, and the predetermined number of symbol elements constituting each of the some of the unit blocks represent a sequence obtained by multiplying an entire second orthogonal sequence having a predetermined length by a first factor from the set of first factors; and
at least one base station comprising:
a receiving unit configured to receive the uplink control channel including the channel quality indicator using the dedicated frequency band when no radio resource is allocated for transmission of the uplink data channel, and
an extracting unit configured to extract the channel quality indicator indicating the downlink radio propagation condition from the uplink control channel.

20. A user device transmitting at least an uplink control channel using a single carrier scheme, comprising:

a first control information generating unit configured to generate first control information to be reported to a base station at predetermined intervals;

a second control information generating unit configured to generate second control information different from the first control information;

a transmitting unit configured to transmit the uplink control channel including at least one of the first control information and the second control information using a dedicated frequency band when no radio resource is allocated for transmission of an uplink data channel, wherein the transmitting unit is configured to transmit a predetermined number of unit blocks in each slot period, and to use a first orthogonal multiplexing method where a set of factors used to multiply some of the unit blocks belonging to a first slot and containing same information represents a first orthogonal sequence;

a predetermined number of symbol elements constituting each of the some of the unit blocks in the first slot represent at least a part of the first control information;

a set of first factors used to multiply the some of the unit blocks belonging to the second slot represents the second control information;

a set of second factors used to multiply the some of the unit blocks belonging to the second slot and containing same information represents a second orthogonal sequence; and a predetermined number of symbol elements constituting each of some of the unit blocks in a second slot represent a sequence obtained by multiplying an entire third orthogonal sequence having a predetermined length by a first factor from the set of first factors and a second factor from the set of second factors, wherein, when the system bandwidth is less than or equal to the predetermined value, a second orthogonal multiplexing method is used wherein:

a second orthogonal sequence having a predetermined length multiplied by a factor from a second set of factors is represented by the predetermined number of symbol elements constituting each of a plurality of unit blocks, and at least a part of the channel quality indicator is represented by a second set of factors multiplied by a plurality of unit blocks.

21. A base station receiving at least an uplink control channel using a single carrier scheme, comprising:

a receiving unit configured to receive the uplink control channel including at least one of first control information and second control information using a dedicated frequency band when no radio resource is allocated for transmission of an uplink data channel;

a first extracting unit configured to extract the first control information reported from a user device at predetermined intervals from the uplink control channel; and a second extracting unit configured to extract the second control information different from the first control information, wherein the receiving unit is configured to receive a predetermined number of unit blocks in each slot period, and wherein the first extracting unit is further configured to extract the first control information and the second extracting unit is further configured to extract the second according to an orthogonal multiplexing method;

a set of factors used to multiply some of the unit blocks belonging to a first slot and containing same information represents a first orthogonal sequence;

a predetermined number of symbol elements constituting each of the some of the unit blocks in the first slot represent at least a part of the first control information;

a set of first factors used to multiply the some of the unit blocks in the second slot represents the second control information;

a set of second factors used to multiply the some of the unit blocks belonging to the second slot and containing same information represents a second orthogonal sequence; and a predetermined number of symbol elements constituting each of some of the unit blocks in a second slot represent a sequence obtained by multiplying an entire third orthogonal sequence having a predetermined length by a first factor from the set of first factors and a second factor from the set of second factors, a second orthogonal multiplexing method where, when the system bandwidth is less than or equal to the predetermined value, a set of first factors used to multiply the some of the unit blocks represents at least a part of the channel quality indicator, and the predetermined number of symbol elements constituting each of the some of the unit blocks represent a sequence obtained by multiplying an entire second orthogonal sequence having a predetermined length by a first factor from the set of first factors.

* * * * *